US009798723B2

(12) United States Patent
Rodet et al.

(10) Patent No.: US 9,798,723 B2
(45) Date of Patent: *Oct. 24, 2017

(54) METHOD AND SYSTEM FOR HANDLING LOCALE AND LANGUAGE IN A CLOUD MANAGEMENT SYSTEM

(71) Applicant: International Business Machines Corporation, Armonk, NY (US)

(72) Inventors: Stephane B. Rodet, Boeblingen (DE); Torsten Teich, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/291,914

(22) Filed: Oct. 12, 2016

(65) Prior Publication Data

US 2017/0031898 A1    Feb. 2, 2017

Related U.S. Application Data

(63) Continuation of application No. 13/539,927, filed on Jul. 2, 2012, now Pat. No. 9,501,295.

(30) Foreign Application Priority Data

Jul. 5, 2011    (EP) ..................... 11172749

(51) Int. Cl.
*G06F 17/20* (2006.01)
*G06F 17/28* (2006.01)
(Continued)

(52) U.S. Cl.
CPC .......... *G06F 17/289* (2013.01); *G06F 9/4448* (2013.01); *G06F 3/0482* (2013.01)

(58) Field of Classification Search
CPC ...... G06F 9/4443; G06F 9/4448; G06F 17/21; G06F 17/2735; H04L 41/22; H04L 12/282
See application file for complete search history.

(56) References Cited

U.S. PATENT DOCUMENTS 5,917,484 A    6/1999  Mullany
6,073,090 A    6/2000  Fortune et al.
(Continued)

OTHER PUBLICATIONS

US Patent Application, dated Jul. 2, 162, for U.S. Appl. No. 13/539,927 (37.288) filed Jul. 2, 2012, invented by Stephane B. Rodet et al., Total 30 pages.
(Continued)

*Primary Examiner* — Abdelali Serrou
(74) *Attorney, Agent, or Firm* — Rabindranath Dutta; Konrad, Raynes, Davda and Victor LLP

(57) ABSTRACT

Provided are a method, system, and computer program product for handling locale and language in a cloud management system, in which a first composite values list of applicable locales and matching languages combinations is generated from at least one language installed on a service management system and at least one locale supported by said service management system. A second composite values list of applicable locales and matching languages combinations is generated as a fall back list based on at least one base language of said service management system and at least one matching locale formed from said at least one base language, if said first composite values list of applicable locales and matching languages is empty. A resulting composite values list of valid locales and languages combinations is provided for further processing.

18 Claims, 3 Drawing Sheets

(51) Int. Cl.
*G06F 9/44* (2006.01)
*G06F 3/0482* (2013.01)

(56) References Cited

U.S. PATENT DOCUMENTS

| | | | |
|---|---|---|---|
| 6,339,755 B1 | 1/2002 | Hetherington et al. | |
| 6,469,713 B2 | 10/2002 | Hetherington et al. | |
| 6,717,588 B1 | 4/2004 | Miller et al. | |
| 7,039,867 B1 | 5/2006 | Scheidig | |
| 7,193,615 B2 | 3/2007 | Kim et al. | |
| 7,257,775 B1 | 8/2007 | Jivakov et al. | |
| 7,383,532 B2 | 6/2008 | Asbury | |
| 7,426,694 B2 | 9/2008 | Gross et al. | |
| 8,261,295 B1 | 9/2012 | Risbood et al. | |
| 8,290,950 B2* | 10/2012 | Tong | G06F 9/4448 707/736 |
| 8,412,510 B2 | 4/2013 | Zhou et al. | |
| 8,438,007 B1 | 5/2013 | Hokari et al. | |
| 8,732,267 B2* | 5/2014 | Banerjee | H04L 67/1097 709/217 |
| 8,782,233 B2 | 7/2014 | Ferris | |
| 8,910,122 B2 | 12/2014 | Baumann et al. | |
| 8,924,539 B2 | 12/2014 | Hogaboom et al. | |
| 9,552,213 B2* | 1/2017 | Grabka | G06F 17/2223 |
| 2002/0099456 A1 | 7/2002 | McLean | |
| 2002/0198719 A1* | 12/2002 | Gergic | G10L 15/22 704/270.1 |
| 2006/0277286 A1 | 12/2006 | Zhang et al. | |
| 2008/0148162 A1* | 6/2008 | Hsiao | G06F 9/4443 715/760 |
| 2009/0198647 A1 | 8/2009 | Tong | |
| 2009/0287471 A1 | 11/2009 | Bennett | |
| 2010/0131649 A1 | 5/2010 | Ferris | |
| 2012/0185786 A1 | 7/2012 | Judd et al. | |
| 2012/0185788 A1* | 7/2012 | Fong | G06F 3/018 715/765 |
| 2012/0239792 A1 | 9/2012 | Banerjee et al. | |
| 2012/0296630 A1* | 11/2012 | Ghassemi | G06F 9/4448 704/3 |

OTHER PUBLICATIONS

Office Action, Mar. 27, 2015, for U.S. Appl. No. 13/539,927 (37.288) filed Jul. 2, 2012, invented by Stephane B. Rodet et al., Total 13 pages.
Response to Office Action, dated Jun. 29, 2015, for U.S. Appl. No. 13/539,927 (37.288) filed Jul. 2, 2012, invented by Stephane B. Rodet et al., Total 16 pages.
Final Office Action, dated Sep. 18, 2015, for U.S. Appl. No. 13/539,927 (37.288) filed Jul. 2, 2012, invented by Stephane B. Rodet et al., Total 9 pages.
Response to Final Office Action, dated Dec. 18, 2016, for U.S. Appl. No. 13/539,927 (37.288) filed Jul. 2, 2012, invented by Stephane B. Rodet et al., Total 16 pages.
Notice of Allowance, dated Jul. 15, 2016, for U.S. Appl. No. 13/539,927 (37.288) filed Jul. 2, 2012, invented by Stephane B. Rodet et al., Total 9 pages.

* cited by examiner

METHOD AND SYSTEM FOR HANDLING LOCALE AND LANGUAGE IN A CLOUD MANAGEMENT SYSTEM

CROSS-REFERENCE TO RELATED APPLICATIONS

This application is a continuation of U.S. patent application Ser. No. 13/539,927, filed Jul. 2, 2012, wherein U.S. patent application Ser. No. 13/539,927 claims priority benefits under Title 35, Unites States Code, Section 119(a)-(d) or Section 365(b) of European Patent Application No. EP11172749.1, filed on Jul. 5, 2011, entitled "METHOD AND SYSTEM FOR HANDLING LOCALE AND LANGUAGE IN A CLOUD MANAGEMENT SYSTEM", wherein U.S. patent application Ser. No. 13/539,927 and European Patent Application No. EP11172749.1 are incorporated herein by reference in their entirety.

BACKGROUND

1. Field

The disclosure relates in general to the field of cloud management systems, and in particular to a method for handling locale and language in a cloud management system and a system for handling locale and language in a cloud management system. Still more particularly, the present disclosure relates to a data processing program and a computer program product for handling locale and language in a cloud management system.

2. Background

Cloud management systems need to be multilingual to accommodate users across the world. In current technologies, Web2.0 and server side language selection and validation are used, which have several limitations. Current server-side solutions determine and validate the user locale and language on the server. For example, JSP uses server side Java-based globalization. Some service management systems could solve that through Java use of separate language and locale handling, while this is not possible inside most JavaScript-based Web2.0 framework environments. Common client-side solutions including JavaScript-based solutions use IP addresses, or Web-browser locales to specify the language of the user interface with which the user interacts. Both schemes are not adapting to dynamic server languages and corresponding user dependencies.

Existing server based applications manage locale and language separately, wherein locales are used for formatting of time, numbers, currencies etc., and languages are used for translation. In certain scenarios, the application maintains the language setting chosen by user in the application preferences. In other prior art applications the language is extracted from the list of browser accept language(s).

According to prior art applications language and locales are either handled separately by the system, or combined locales are created from two default locales which are known by the system.

In the Patent Publication U.S. Pat. No. 6,339,755 B1 "METHOD, SYSTEM AND DATA STRUCTURE FOR SPLITTING LANGUAGE AND LOCALE PROPERTIES IN A DATA PROCESSING SYSTEM" by Hetherington et al. an implementation of separate language and locale properties within a data processing system is disclosed. The language property only controls selection of the human language employed for user interface text and, preferably, the sort order for text-based items displayed in the user interface. The locale property controls all other cultural support, number format, date format, currency and currency format, time format etc. This split allows a particular language to be selected without utilizing a particular set of cultural conventions associated with a region in which the selected language is dominant.

In the Patent Publication U.S. Pat. No. 6,073,090 "SYSTEM AND METHOD FOR INDEPENDENTLY CONFIGURING INTERNATIONAL LOCATION AND LANGUAGE" by Fortune et al. a system and method for independently configuring international location and language in a computer system are disclosed. In the disclosed system and method composite locales for user-selected location and language combinations are generated whenever a user-selected location and language combination is unsupported by default locales. The system includes a location format retrieval element for retrieving location specific formatting data and a language format retrieval element for retrieving language-specific formatting data. Retrieved location-specific and language-specific data are combined to generate a composite locale. The composite locale is generated from default locales, wherein location specific formatting data is retrieved from a first default locale and the language-specific formatting data is retrieved from a second default locale. The composite locale is generated by combining the formatting data retrieved from the first and second default locales. Alternatively, a composite locale is generated from data retrieved from a location database and from a language database.

In the Patent Publication U.S. Pat. No. 5,917,484 "MULTILINGUAL SYSTEM LOCALE CONFIGURATION" by Mullaney computer implemented methods of configuring system locale in a computer system and apparatus for implementing same are disclosed. The disclosed methods comprise presenting a computer user with a multilingual, yet locale independent, language selection screen. It is further described how to select languages and locales in a general manner, e.g. at installation time, using bitmaps to achieve language independency.

All those patents don't describe how to combine languages of connected systems and match them with preferred user languages and locales, and how the default login mechanism works.

In a real-world example a so called Dojo approach, which is a JavaScript framework, a locale of an application is determined by pulling the locale from the browser navigator object. However, developers can force the default locale by using a djConfig locale setting, often done by app servers to establish locale based on user preferences. The Dojo locale must be established at bootstrap time and cannot be changed later. Locales must be specified in all lowercase with dashes separating variants.

In addition to the locale, developers can specify that extra locale files are also downloaded in parallel. The argument to the extra locale parameter is an array of strings representing locales. The extra locale is used only for edge cases like multi-lingual pages or for dynamically switching languages. It is generally more efficient and preferred to switch languages by reloading the page and changing the locale setting. An example use case for extra locale would be a language tutorial—a page in the user's native language that teaches Japanese.

Prior art embodiments may have the problem that a client supports only locale, and a server supports locale and language, wherein locale and language are not intuitive for the self-service user to select and maintain, especially if he is able to create invalid combinations that way. Further simplified locale scheme fits into cloud scenarios where the user doesn't know to which cloud hosts he connects to.

SUMMARY OF THE PREFERRED EMBODIMENTS

Provided are a method, system, and computer program product for handling locale and language in a cloud management system, in which a first composite values list of applicable locales and matching languages combinations is generated from at least one language installed on a service management system and at least one locale supported by said service management system. A second composite values list of applicable locales and matching languages combinations is generated as a fall back list based on at least one base language of said service management system and at least one matching locale formed from said at least one base language, if said first composite values list of applicable locales and matching languages is empty. A resulting composite values list of valid locales and languages combinations is provided for further processing.

BRIEF DESCRIPTION OF THE DRAWINGS

Referring now to the drawings in which like reference numbers represent corresponding parts throughout.

DETAILED DESCRIPTION

Figure 1:
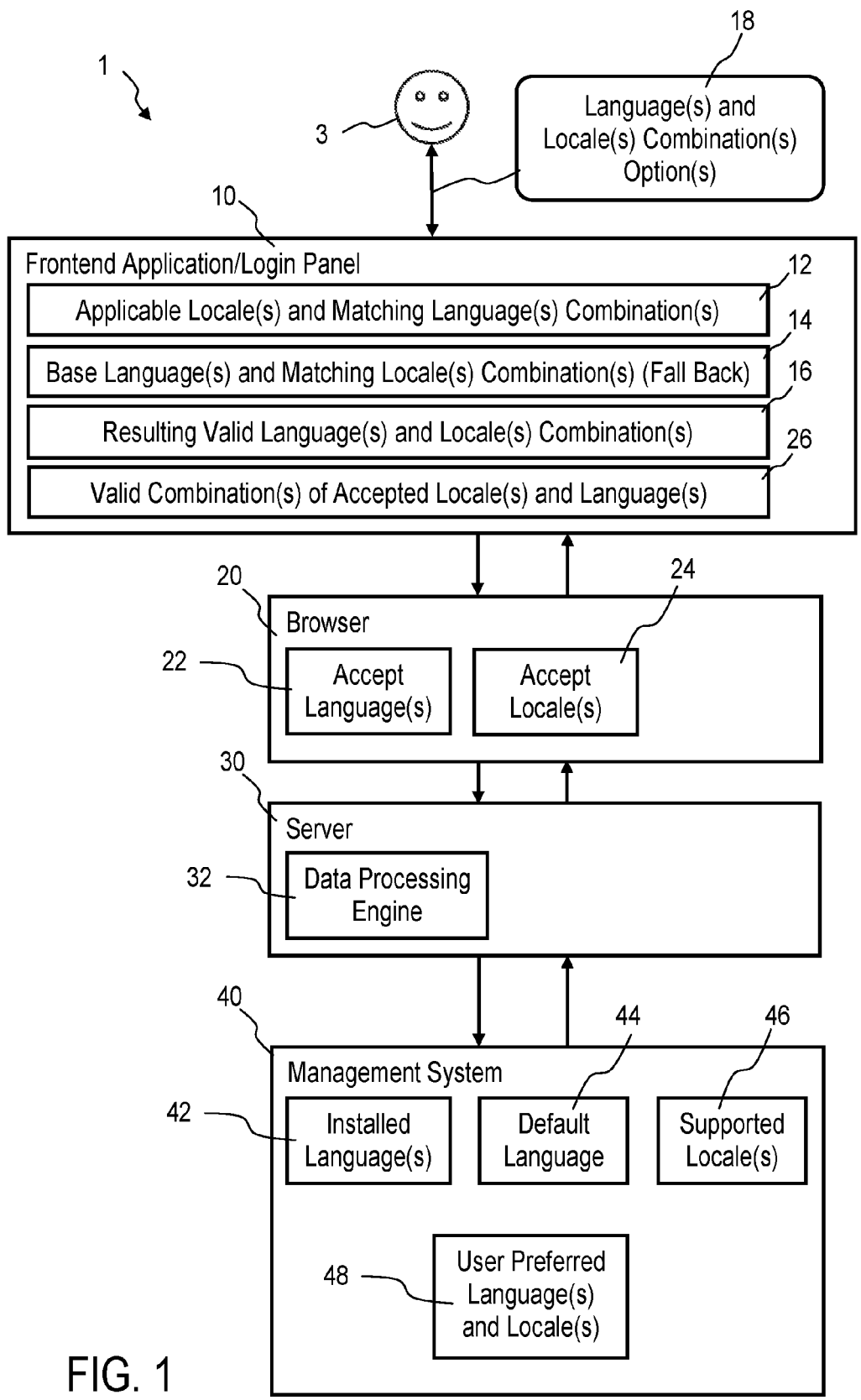
FIG. 1 is a schematic block diagram of a cloud management system comprising a system for handling locale and language in a cloud management system, in accordance with certain embodiments.

Certain embodiments provide a method for handling locale and language in a cloud management system and a system for handling locale and language in a cloud management system. Such embodiments are able to enable multiple languages and locales and solve shortcomings of prior art handling of locales and languages in a cloud management system.

Accordingly, in certain embodiments, a method for handling locale and language in a cloud management system comprises: generating a first composite values list of applicable locales and matching languages combinations from at least one language installed on a service management system and at least one locale supported by the service management system; generating a second composite values list of applicable locales and matching languages combinations as fall back list based on at least one base language of the service management system and at least one matching locale formed from the at least one base language, if the first composite values list of applicable locales and matching languages is empty; and providing a resulting composite values list of valid locales and languages combinations for further processing.

In further embodiments, the resulting composite values list of valid locales and languages combinations is used at least for one of the following processes: adjustment of a user interface; and presenting a list of language and locale combination options for selection to a user.

In further embodiments, the adjustment process of the user interface further comprises: generating a list of valid language and locale combinations based on at least one language and at least one locale accepted by a browser and a user preferred language and locale setting; matching the list of valid language and locale combinations with the resulting composite values list of valid locales and languages combinations; eliminating valid combinations of the list of valid language and locale combinations which are not supported by the service management system resulting in a modified list of valid language and locale combinations; and translating user interface elements and messages based on the modified list of valid language and locale combinations.

In further embodiments, the presenting process of the list of at least one language and locale combination option is performed during at least one of the following processes: changing user preferred locale and language settings, and creating a new user account and setting at least one user preferred locale and at least one user preferred language.

In further embodiments, the changing process and the setting process of user preferred locale and language settings comprises: deriving a language code and a locale code from the valid language and locale combination selected by an user out of the list of language and locale combination options; and storing the derived language code as user preferred language, and the derived locale code as user preferred locale.

Further embodiments comprises: modifying the first composite values list of applicable locales and matching languages combinations and the second composite values list of applicable locales and matching languages combinations in case of performed changes of the service management system; and providing a new resulting composite values list of valid locales and languages combinations for further processing.

In further embodiments, a fall back mechanism is provided if the user preferred locale and language setting is not compatible with the new resulting composite values list of valid locales and languages combinations.

In another embodiment, a system for handling locale and language in a cloud management system comprises a frontend application, a browser accepting at least one language and at least one locale, a server, and a service management system providing at least one installed language, an installed base language used as fall back language, at least one supported locale, and a user preferred locale and language setting per user, wherein the frontend application generates a first composite values list of applicable locales and matching languages combinations from at least one language installed on the service management system and at least one locale supported by the service management system; wherein the frontend application generates a second composite values list of applicable locales and matching languages combinations as fall back list based on at least one base language of the service management system and at least one matching locale formed from the at least one base language, if the first composite values list of applicable locales and matching languages is empty; and wherein the frontend application provides a resulting composite values list of valid locales and languages combinations for further processing.

In further embodiments, the frontend application uses the resulting composite values list of valid locales and languages combinations for at least one of the following processes: adjustment of a user interface; and presenting a list of language and locale combination options for selection to a user.

In further embodiments, the frontend application generates a list of valid language and locale combinations for the adjustment process of the user interface based on at least one language and at least one locale accepted by the browser, and the user preferred language and locale setting; matches the list of valid language and locale combinations with the resulting composite values list of valid locales and languages combinations; eliminates valid combinations of the list of valid language and locale combinations which are not supported by the service management system resulting in a modified list of valid language and locale combinations; and translates user interface elements and messages based on the modified list of valid language and locale combinations.

In further embodiments, the frontend application performs the presenting process of the list of at least one language and locale combination option during at least one of the following processes: changing user preferred locale and language settings, and creating a new user account and setting at least one user preferred locale and at least one user preferred language.

In further embodiments, the changing process and the setting process of preferred locale and language settings comprise the steps: deriving a language code and a locale code from the preferred valid language and locale combination selected by an user out of the list of language and locale combination options; and storing the derived language code as preferred language, and the derived locale code as preferred locale.

In further embodiments, the frontend application modifies the first composite values list of applicable locales and matching languages combinations and the second composite values list of applicable locales and matching languages combinations in case of performed changes of the service management system; provides a new resulting composite values list of valid locales and languages combinations for further processing; and provides a fall back mechanism if the user preferred locale and language setting is not compatible with the new resulting composite values list of valid locales and languages combinations.

In another embodiment, a data processing program for execution in a data processing system comprises software code portions for performing a method for handling locale and language in a cloud management system when the program is run on the data processing system.

In yet another embodiment, a computer program product stored on a computer-usable medium, comprises computer-readable program means for causing a computer to perform a method for handling locale and language in a cloud management system when the program is run on the computer.

All in all, certain embodiments determine valid combinations of locale and language based on a user's browser setting and locale and language installed at service management system.

The core idea of the present disclosure is to determine globalization parameters, i.e. language and locale, which a service management system uses, e.g. where a HTML5 application or Web2.0 application is displayed in, by using a mix and match algorithm which combines the parameters "user preferred language" and "browser accept languages" with the globalization settings of one or multiple service providers which contains system supported language(s), and a system base language, the location where the server is operated, and by using a reverse mix and match algorithm in order to store the user preferred language and locale in an user preferences store of the service management system.

In certain embodiments a client calculates a list of user selectable locales by a mix and match algorithm from parameters received from servers and/or service management systems. The parameters comprise in particular a list of installed languages, a list of supported locales, a default language, a default locale, i.e. a location on earth from where the server is operated. The client writes back both locale and language to the server by a "reverse mix and match algorithm", thus ensuring compatibility with the traditional framework. The client shows contents according to selected locale, else falls back to the default language using a fallback mechanism. The self-service user only manages one setting, i.e. his preferred locale. The language is maintained in the background.

Certain embodiments make a user interface simpler to use and to understand, because selecting the correct locale which matches valid languages is complicated for the user, and may lead to errors. Furthermore, the self-service user (non-administrator) doesn't know which languages the connected management systems supports, especially if they are in different parts of the world, like in typical cloud scenarios. Therefore certain embodiments mix and match the user preferred settings with the supported languages to support the constraints of the system. After all, certain embodiments provide location independent technologies and take the user needs into account.

FIG. 1 shows a cloud management system 1 comprising a system for handling locale and language in a cloud management system 1, in accordance with certain embodiments.

Referring to FIG. 1, the cloud management system 1 comprises a frontend application 10, a browser 20, e.g. a web-browser, accepting at least one language 22 and at least one locale 24, a server 30, e.g. a web-server, comprising a data processing engine 32, and a service management system 40 providing at least one installed language 42, an installed base language 44 used as fall back language, at least one supported locale 46, and a user preferred locale and language setting 48 per user. In certain embodiments, the frontend application 10 generates a first composite values list 12 of applicable locales and matching languages combinations from at least one language 42 installed on the service management system 40 and at least one locale 46 supported by the service management system 40. The frontend application 10 generates a second composite values list 14 of applicable locales and matching languages combinations as fall back list based on at least one base language 44 of the service management system 40 and at least one matching locale formed from the at least one base language 44, if the first composite values list 12 of applicable locales and matching languages is empty. Further the frontend application 10 provides a resulting composite values list 16 of valid locales and languages combinations for further processing.

For further processing the frontend application 10 uses the resulting composite values list 16 of valid locales and languages combinations for an adjustment process of a user interface; and for presenting a list 18 of language and locale combination options for selection to a user 3.

Based on at least one language 22 and at least one locale 24 accepted by the browser 20, and the user preferred language and locale setting 48 the frontend application 10 generates a list 26 of valid language and locale combinations for the adjustment process of the user interface, matches the list 26 of valid language and locale combinations with the resulting composite values list 16 of valid locales and languages combinations, eliminates valid combinations of the list of valid language and locale combinations 26 which are not supported by the service management system 40 resulting in a modified list 26 of valid language and locale combinations; and translates user interface elements and messages based on the modified list 26 of valid language and locale combinations.

The frontend application 10 performs the presenting process of the list 18 of at least one language and locale combination option during a changing process of user preferred locale and language settings 48 and/or during a creating process of a new user account setting at least one user preferred locale and at least one user preferred language. During the changing process and the setting process of preferred locale and language settings 48 a language code and a locale code is derived from the preferred valid language and locale combination selected by an user 3 out of the list 18 of language and locale combination options; and the derived language code is stored as preferred language, and the derived locale code is stored as preferred locale in the user preferred language and locale setting 48.

In case of performed changes of the service management system 40 the frontend application 10 modifies the first composite values list 12 of applicable locales and matching languages combinations and the second composite values list 14 of applicable locales and matching languages combinations; provides a new resulting composite values list 16 of valid locales and languages combinations for further processing; and provides a fall back mechanism if the user preferred locale and language setting 48 is not compatible with the new resulting composite values list 16 of valid locales and languages combinations.

In the context of cloud and service management, this disclosure describes a solution for enabling multiple languages and their corresponding locales on an interface, for example a HTML5 or Web 2.0 interface. Certain embodiments show how to use and synchronize user locales and languages between the client and the back-end, as the set of languages can be variable depending on the cloud management system configuration, wherein "enabling multiple languages" means treating the scenarios of locale and language management creating and updating user profiles, as well as their use before log-in, and after log-in.

Certain embodiments distinguish between "before login" and "user logged in" scenarios. Before login, the mix and match algorithm is also used but with different input parameters, i.e. browser accept language 22, installed languages 42 of the connected service management systems 40 and/or servers 30.

Certain embodiments show how to manage locales and languages consistently in a cloud management system 1, a Web 2.0 and HTML5 environment, for example, so that the interface built on recent browser technologies complies with the need of a complete service management back-end used as a cloud management system 1.

Before login, just a browser code (HTML, JavaScript, CSS) has been loaded from the management server 30. Here the interface just selects the language from the browser locale 24, because no other information is available. Indeed, the server 30 doesn't deliver system specific data without authentication. Also before login, there is no information yet on the user 3, so certain embodiments cannot get more detailed information to make a better locale and language choice. As a standard locale system, the interface will use the standard browser language bundle selection scheme, and revert back from any language to English, for example, in case the required locale is missing.

The user 3 wants to get the user interface presented in his preferred language and locale. In case the user 3 enters an URL in a login panel 10 before log-in. The browser 20 requests a corresponding log-in page in the browser accept language 22 and locale 24. The browser 20 sends the request to the server 30. The server 30 performs the log-in handling and generates the corresponding login page. The server 30 extracts the language from the browser request and encloses it in the response containing the log-in page, e.g. html-page. The log-in page is rendered by the browser 20 and interpreted by the login panel 10. The login panel 10 sets the language to the browser accept language 22.

When the user 3 logs in, the login panel 10 loads a main HTML page containing the frontend application 10, thus referencing all the JavaScript code and booting it. Before the JavaScript toolkit initializes the frontend application 10, the data for the localization and globalization have to be requested and computed. Once the log-in request has been successful, the server locale is retrieved from the user profile 48 stored on the management system 40. It is checked if a locale has been set for this user 3. The preferred user language is not taken into account. If there is a user preferred locale, it is checked whether a corresponding language 42 is installed on the management system 40. If no corresponding language to the user preferred locale is installed, it is revert back to the default language 44, i.e. "base language" of the management system 40. Else the user locale of the user preferred settings 48 is selected as the current locale. The setting process of the locale of the frontend application 10 is described in the following referring to FIG. 2.

Figure 2:
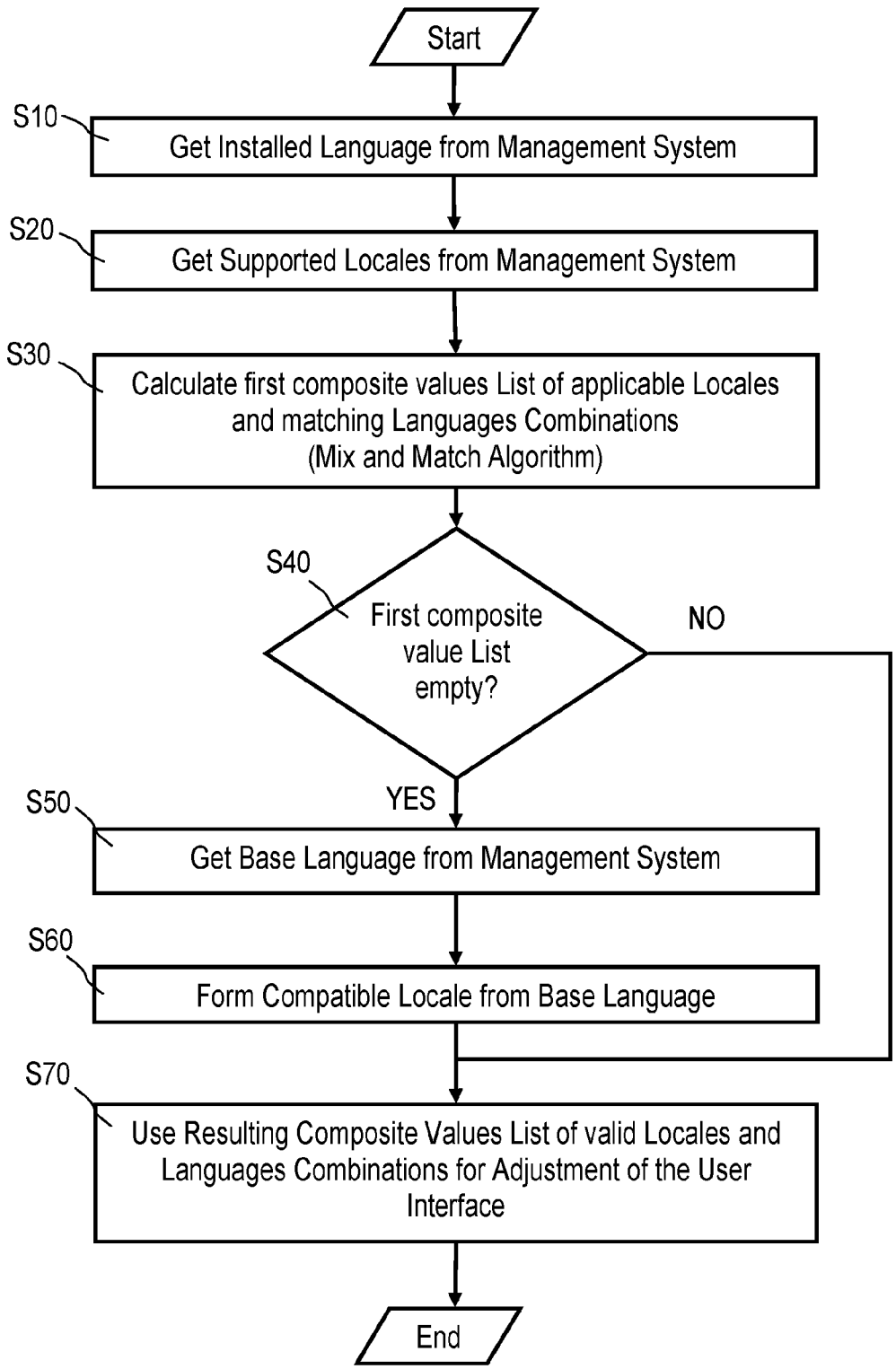
FIG. 2 is a schematic flow diagram of a method for handling locale and language in a cloud management system, in accordance with a first embodiment.

FIG. 2 shows a method for handling locale and language in a cloud management system 1, in accordance with a first embodiment. The first embodiment of the method for handling locale and language in a cloud management system 1 consists of a method for selecting a locale and language in a cloud management system 1.

Referring to FIG. 2, the shown algorithm is used to determine the current locale using which the frontend application 10 is rendered. The goal is to find a resulting locale which matches the user preferred language and locale with the installed languages and locales of the management system 40. The fall back is the base language 44 in which the management system 40 is installed.

The frontend application 10 gets the installed language(s) 42 from the management system 40, in step S10. In step S20, the frontend application 10 gets the supported locale(s) from the management system 40. In step S30, the mix and match algorithm is performed and the first composite values list 12 of applicable locales and matching languages combinations is calculated from at least one language 42 installed on the service management system 40 and at least one locale 46 supported by the service management system 40. In step S40 it is checked, whether the first composite values list 12 of applicable locales and matching languages combinations is empty, or not.

If the first composite values list 12 of applicable locales and matching languages combinations is not empty, the first composite values list 12 of applicable locales and matching languages combinations is used as resulting composite values list 16 of valid locales and languages combinations, in step S70.

If the first composite values list 12 of applicable locales and matching languages combinations is empty, the frontend application 10 gets the base language 44 as default language from the management system 40, in step S50. In step S60, the frontend application 10 forms a compatible locale from the base language forming the second composite values list 14 of applicable locales and matching languages combinations, which is used as resulting composite values list 16 of valid locales and languages combinations, in step S70.

In step S70, the resulting composite values list 16 of valid locales and languages combinations is used to adjust the user interface. So the frontend application 10 translates user interface elements and messages based on the resulting list 26 of valid language and locale combinations.

The cloud management system 1 supports changing both the locale and the language—as separate values. The possible locales are represented by a list of all locales and do not vary across management systems, while a language list is limited to those languages installed by the server administrators. Though, there are problems with that double locale/language approach. The first problem is that a current JavaScript framework (web browser) only knows a locale which contains the language also. The second problem is that with these two entries (locale and language), the user can enter incompatible values, for example locale EN-US and language DE.

To solve these issues, certain embodiments only support a locale entry field—no language anymore—where the possible list of locales is matched against all the languages installed on the management system 40. A matching table is produced and every locale is checked against it, for example. Only the matching locales, i.e. the locales whose language is installed on the management system 40, are available for user selection. For example, if German DE is installed as language, the locales DE-AT for Austria, DE-CH for Switzerland, and DE-DE for Germany are part of the matching table. For compatibility with other systems and interfaces connecting with the management system 40, the language value is set in the background, hiding from the user interface.

Figure 3:
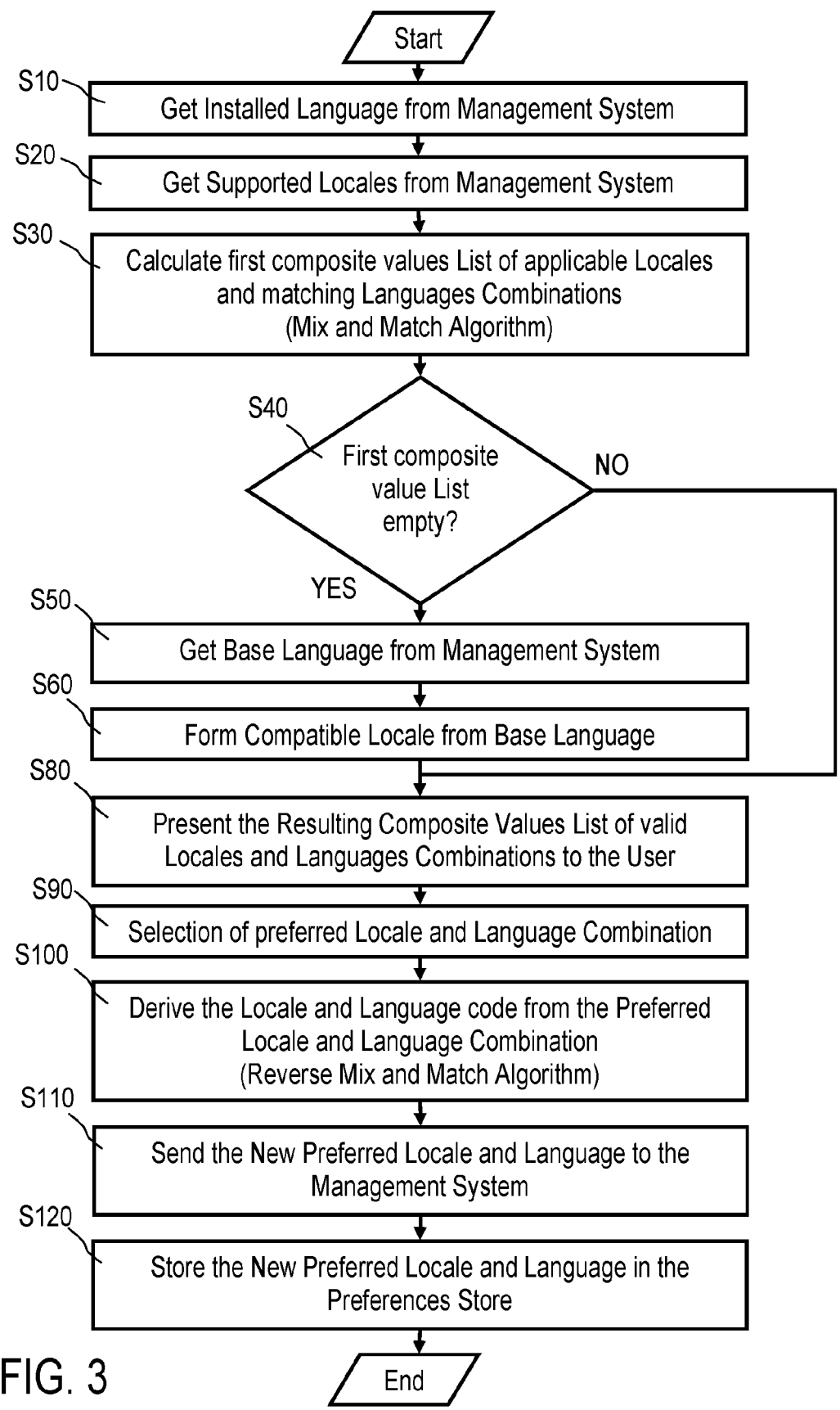
FIG. 3 is a schematic flow diagram of a method for handling locale and language in a cloud management system, in accordance with a second embodiment.

FIG. 3 shows a method for handling locale and language in a cloud management system 1, in accordance with a second embodiment. The second embodiment of the method for handling locale and language in a cloud management system 1 consists of a method for changing of user preferred locale and language setting 48 in a cloud management system 1. This algorithm is used to calculate a list of locales and languages which the user can set as preferred ones. These language and locale settings must be compatible with the languages installed on the management system 40, and with the locales supported by the management system 40.

Referring to FIG. 3, the shown algorithm may be used to change the user preferred locale and language settings 48, and to create a preferred locale language setting 48 for a new user account. The steps S10 to S60 of the second embodiment of the method for handling locale and language in a cloud management system correspond to the steps S10 of the S60 of the first embodiment of the method for handling locale and language in a cloud management system.

So, the frontend application 10 gets the installed language(s) 42 from the management system 40, in step S10, and the supported locale(s) from the management system 40, in step S20. In step S30, the mix and match algorithm is performed and the first composite values list 12 of applicable locales and matching languages combinations is calculated from at least one language 42 installed on the service management system 40 and at least one locale 46 supported by the service management system 40. In step S40 it is checked, whether the first composite values list 12 of applicable locales and matching languages combinations is empty, or not.

If the first composite values list 12 of applicable locales and matching languages combinations is not empty, the first composite values list 12 of applicable locales and matching languages combinations is used as resulting composite values list 16 of valid locales and languages combinations, in step S80.

If the first composite values list 12 of applicable locales and matching languages combinations is empty, the frontend application 10 gets the base language 44 as default language from the management system 40, in step S50. In step S60, the frontend application 10 forms a compatible locale from the base language forming the second composite values list 14 of applicable locales and matching languages combinations, which is used as resulting composite values list 16 of valid locales and languages combinations, in step S80.

In step S80, the resulting composite values list 16 of valid locales and languages combinations is presented to the user. In step S90, a preferred locale and language combination is selected by the user 3. In step S100, a reverse mix and match algorithm is performed and a locale and language code is derived from the selected preferred locale and language combination. In step S110 the new preferred locale and language are sent to the management system 40. In step S120 the new preferred locale and language are stored in the preferences store 48.

In case a language gets uninstalled and some user have this language set through the locale, the log-in process will fall back to base language of the cloud management system.

Certain embodiments can be applied to standard or proprietary client-server technologies and protocols, other than Web2.0/HTML5.

Certain embodiments can be enriched by adding further components and functions in order to manage the language and locale parameters of cloud managed systems. The managed systems are the system provisioned by the management system. Following the logic describe in the present disclosure, certain embodiments could extend the management of the provisioned servers so that the default locale and language on the provisioned systems are set to the locale and language of the user, and in case these are not available, a similar fallback would be applied.

Certain embodiments can be extended to accommodate an additional factor for multitenancy enablement. In that context, all users are assigned to exactly one customer. A customer object contains locale or language information and gets integrated into the language precedence calculation. The customer locale is the default value for the locale of users belonging to that customer. If no customer locale or language is set, the default user locale is the system base language.

The method for handling locale and language in a cloud management system can be implemented as an entirely software embodiment, or an embodiment containing both hardware and software elements. Certain embodiments are implemented in software, which includes but is not limited to firmware, resident software, microcode, etc.

Furthermore, certain embodiments can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include Compact Disc—read only memory (CD-ROM), Compact Disc—read/write (CD-R/W), and DVD. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A method for handling locale and language in a cloud management system, the method comprising:
   generating, by using a frontend application executed via a processor in the cloud management system, and via operations implementing a mix and match mechanism that combines parameters indicating a user preferred language and browser accept languages with globalization settings of one or more service providers which contain one or more system supported languages, a system base language, and a location where a server is operated, a first composite values list of applicable locales and matching languages combinations;
   in response to determining that the first composite values list of applicable locales and matching languages combinations is empty, generating a second composite values list of applicable locales and matching languages combinations as a fall back list, and using the second composite values list as a resulting composite values list of valid locales and languages combinations for further processing; and
   in response to determining that the first composite values list of applicable locales and matching languages combinations is not empty, presenting the first composite values list of applicable locales and languages combinations to a user, and based on selection of preferred locale and language combinations by the user, deriving locale and language code for further processing, via operations implementing a reverse mix and match mechanism.

2. The method of claim 1, wherein the resulting composite values list of valid locales and languages combinations is used for adjustment of a user interface.

3. The method of claim 2, wherein the adjustment of the user interface further comprises:
   generating a list of valid language and locale combinations based on at least one language and at least one locale accepted by a browser and a user preferred language and locale setting;
   matching the list of valid language and locale combinations with the resulting composite values list of valid locales and languages combinations;
   eliminating valid combinations of the list of valid language and locale combinations which are not supported by a service management system to result in a modified list of valid language and locale combinations; and
   translating user interface elements and messages based on the modified list of valid language and locale combinations.

4. The method of claim 1, wherein the resulting composite values list of valid locales and languages combinations is used for presenting a list of language and locale combination options for selection to a user.

5. The method of claim 4, wherein the presenting of the list of language and locale combination options for selection to the user is performed during a changing of user preferred locale and language settings.

6. The method of claim 4, wherein the presenting of the list of language and locale combination options for selection to the user is performed during a creating of a new user account and a setting of at least one user preferred locale and at least one user preferred language.

7. A system for handling locale and language in a cloud management environment, the system comprising:
   a processor; and
   a computer readable storage medium having program code embodied therewith, the program code executable by the processor in the cloud management environment to cause the processor to perform operations, the operations comprising:
   generating, by using a frontend application and via operations implementing a mix and match mechanism that combines parameters indicating a user preferred language and browser accept languages with globalization settings of one or more service providers which contain one or more system supported languages, a system base language, and a location where a server is operated, a first composite values list of applicable locales and matching languages combinations;
   in response to determining that the first composite values list of applicable locales and matching languages combinations is empty, generating a second composite values list of applicable locales and matching languages combinations as a fall back list, and using the second composite values list as a resulting composite values list of valid locales and languages combinations for further processing; and
   in response to determining that the first composite values list of applicable locales and matching languages combinations is not empty, presenting the first composite values list of applicable locales and languages combinations to a user, and based on selection of preferred locale and language combinations by the user, deriving locale and language code for further processing, via operations implementing a reverse mix and match mechanism.

8. The system of claim 7, wherein the resulting composite values list of valid locales and languages combinations is used for adjustment of a user interface.

9. The system of claim 8, wherein the adjustment of the user interface further comprises:
   generating a list of valid language and locale combinations based on at least one language and at least one locale accepted by a browser and a user preferred language and locale setting;
   matching the list of valid language and locale combinations with the resulting composite values list of valid locales and languages combinations;
   eliminating valid combinations of the list of valid language and locale combinations which are not supported by a service management system to result in a modified list of valid language and locale combinations; and translating user interface elements and messages based on the modified list of valid language and locale combinations.

10. The system of claim 7, wherein the resulting composite values list of valid locales and languages combinations is used for presenting a list of language and locale combination options for selection to a user.

11. The system of claim 10, wherein the presenting of the list of language and locale combination options for selection to the user is performed during a changing of user preferred locale and language settings.

12. The system of claim 10, wherein the presenting of the list of language and locale combination options for selection to the user is performed during a creating of a new user account and a setting of at least one user preferred locale and at least one user preferred language.

13. A computer program product for handling locale and language in a cloud management system, the computer program product comprising a non-transitory computer readable medium, wherein a computer-readable program stored in the non-transitory computer readable medium when executed causes a computer in the cloud management system to perform operations, the operations comprising:

generating, by using a frontend application and via operations implementing a mix and match mechanism that combines parameters indicating a user preferred language and browser accept languages with globalization settings of one or more service providers which contain one or more system supported languages, a system base language, and a location where a server is operated, a first composite values list of applicable locales and matching languages combinations;

in response to determining that the first composite values list of applicable locales and matching languages combinations is empty, generating a second composite values list of applicable locales and matching languages combinations as a fall back list, and using the second composite values list as a resulting composite values list of valid locales and languages combinations for further processing; and in response to determining that the first composite values list of applicable locales and matching languages combinations is not empty, presenting the first composite values list of applicable locales and languages combinations to a user, and based on selection of preferred locale and language combinations by the user, deriving locale and language code for further processing, via operations implementing a reverse mix and match mechanism.

14. The computer program product of claim 13, wherein the resulting composite values list of valid locales and languages combinations is used for adjustment of a user interface.

15. The computer program product of claim 14, wherein the adjustment of the user interface further comprises:

generating a list of valid language and locale combinations based on at least one language and at least one locale accepted by a browser and a user preferred language and locale setting;

matching the list of valid language and locale combinations with the resulting composite values list of valid locales and languages combinations;

eliminating valid combinations of the list of valid language and locale combinations which are not supported by a service management system to result in a modified list of valid language and locale combinations; and translating user interface elements and messages based on the modified list of valid language and locale combinations.

16. The computer program product of claim 13, wherein the resulting composite values list of valid locales and languages combinations is used for presenting a list of language and locale combination options for selection to a user.

17. The computer program product of claim 16, wherein the presenting of the list of language and locale combination options for selection to the user is performed during a changing of user preferred locale and language settings.

18. The computer program product of claim 16, wherein the presenting of the list of language and locale combination options for selection to the user is performed during a creating of a new user account and a setting of at least one user preferred locale and at least one user preferred language.

* * * * *